(12) United States Patent
Bartlett et al.

(10) Patent No.: US 8,157,388 B2
(45) Date of Patent: Apr. 17, 2012

(54) SYSTEM AND METHOD FOR A PROJECTION DISPLAY SYSTEM USING AN OPTICAL LIGHTGUIDE

(75) Inventors: Terry Alan Bartlett, Dallas, TX (US); Patrick Rene Destain, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 917 days.

(21) Appl. No.: 12/059,840

(22) Filed: Mar. 31, 2008

(65) Prior Publication Data

US 2009/0244499 A1  Oct. 1, 2009

(51) Int. Cl.
*G03B 21/20* (2006.01)

(52) U.S. Cl. ............................. 353/85; 385/35

(58) Field of Classification Search .......... 353/84, 353/99; 362/551–583; 385/35, 131, 5
See application file for complete search history.

(56) References Cited

U.S. PATENT DOCUMENTS

| | | | |
|---|---|---|---|
| 5,119,113 A | 6/1992 | Prakash et al. | |
| 5,365,538 A | 11/1994 | Tumminelli et al. | |
| 5,684,899 A | 11/1997 | Ota | |
| 5,845,981 A | 12/1998 | Bradley | |
| 6,334,685 B1 * | 1/2002 | Slobodin | 353/31 |
| 6,511,184 B2 * | 1/2003 | Yamagishi et al. | 353/31 |
| 6,540,362 B1 | 4/2003 | Janssen | |
| 6,560,385 B2 | 5/2003 | Guida et al. | |
| 6,688,758 B2 | 2/2004 | Thibault | |
| 7,088,321 B1 * | 8/2006 | Parker | 345/83 |
| 2004/0174501 A1 * | 9/2004 | Slobodin et al. | 353/94 |
| 2005/0286123 A1 * | 12/2005 | Abu-Ageel | 359/443 |

* cited by examiner

*Primary Examiner* — Francis M Legasse, Jr.
*Assistant Examiner* — Jerry Brooks
(74) *Attorney, Agent, or Firm* — Warren L. Franz; Wade J. Brady, III; Frederick J. Telecky, Jr.

(57) ABSTRACT

A system and method for using an optical lightguide in a projection display system. A plurality of light sources provides a plurality of colored light to a lightguide. The lightguide may include alternating layers of a relatively high refractive index material and a relatively low refractive index material. In an embodiment, the layers of the lightguide are tapered. In another embodiment, the lightguide includes a light pipe having a lenticular array on the entrance face of the light pipe. Optionally, the light pipe may be tapered. The lightguide provides a line of light to a scanning element, which in turn redirects the light to a spatial light modulator.

19 Claims, 17 Drawing Sheets

SYSTEM AND METHOD FOR A PROJECTION DISPLAY SYSTEM USING AN OPTICAL LIGHTGUIDE

TECHNICAL FIELD

The present invention relates generally to a system and method for displaying images, and more particularly to a system and method for increasing line uniformity in laser illuminated display systems.

BACKGROUND

In a microdisplay-based projection display system, light from a light source may be modulated by the microdisplay as the light reflects off the surface of the microdisplay or passes through the microdisplay. Examples of commonly used microdisplays may include digital micromirror devices (DMD), deformable micromirror devices, transmissive or reflective liquid crystal, liquid crystal on silicon, ferroelectric liquid crystal on silicon, and so forth. In a DMD-based projection system, where large numbers of positional micromirrors may change state (position) depending on an image being displayed, light from the light source may be reflected onto or away from a display plane.

In operation, one type of projection display system using a DMD sequentially flooded the surface of the microdisplay with different colors of light from a high etendue light source, such as a lamp. The individual mirrors of the DMD were controlled to selectively turn each mirror (e.g., each pixel) either on or off as each of the different colors of light were shone on the DMD. When performed fast enough, the human eye integrates the sequential colors to form different colors and images.

Recent attempts have been made to use a scanning line in combination with a low etendue light source such as a laser. In these attempts, lines of colored light are scanned across the surface of a DMD. The individual mirrors were controlled to selectively turn each mirror on or off as the line of light passes over each respective mirror. This method, however, generally requires a very uniform intensity level over the length of the DMD in order to obtain a high quality image. If the intensity level is not uniform, then color streaking may occur in the displayed image. In order to obtain a line having a uniform intensity level, a long light pipe with complicated optics with strict alignment tolerances was required, thereby increasing costs and, possibly, decreasing yields during manufacturing.

Furthermore, the timing of the scan lines with respect to the DMD must be synchronized. As discussed above, the individual mirrors of the DMD are individually controlled to turn either on or off as the line pass over the DMD. Because the width of the line is small and the lines scan over the DMD many times a second, the timing and the position of the scan line is important in order to be able to correctly display an image. If the scan line is out of synch with the DMD, then either too much or not enough light may be redirected to the display image.

Therefore, there is a need for an illumination technique that provides a line of light having a substantially uniform intensity level for a light source in projection display systems.

SUMMARY OF THE INVENTION

These and other problems are generally solved or circumvented, and technical advantages are generally achieved, by embodiments of a system and a method for increasing display brightness in laser illuminated display systems.

In accordance with an embodiment, an optical lightguide is provided. The optical lightguide includes substantially planar layers of a first material having first and second major surfaces. The first and second major surfaces are adjacent to layers of a second material, wherein the first material has a refractive index greater than the refractive index of the second material.

In accordance with another embodiment, a method of displaying an image is provided. The method includes providing a plurality of light sources for emitting light to a multi-layer lightguide. The multi-layer lightguide includes a plurality of layers separated by an element having a lower refractive index. The plurality of layers of the lightguide are tapered and provides light to a scanning element, which in turn provides the light to a spatial light modulator.

In accordance with yet another embodiment, a projection display system is provided. The projection display system includes a plurality of light sources for emitting multiple colors to an optical lightguide. The optical lightguide includes alternating tapered layers of a first substance and a second substance, wherein the first substance has a higher refractive index than the second substance. The layers of the first substance receives light from the plurality of light sources and provides lines of light to a scanning element, which in turn redirects the light to a spatial light modulator.

The foregoing has outlined rather broadly the features and technical advantages of embodiments in order that the detailed description of the embodiments that follow may be better understood. Additional features and advantages of the embodiments will be described hereinafter which form the subject of the claims. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
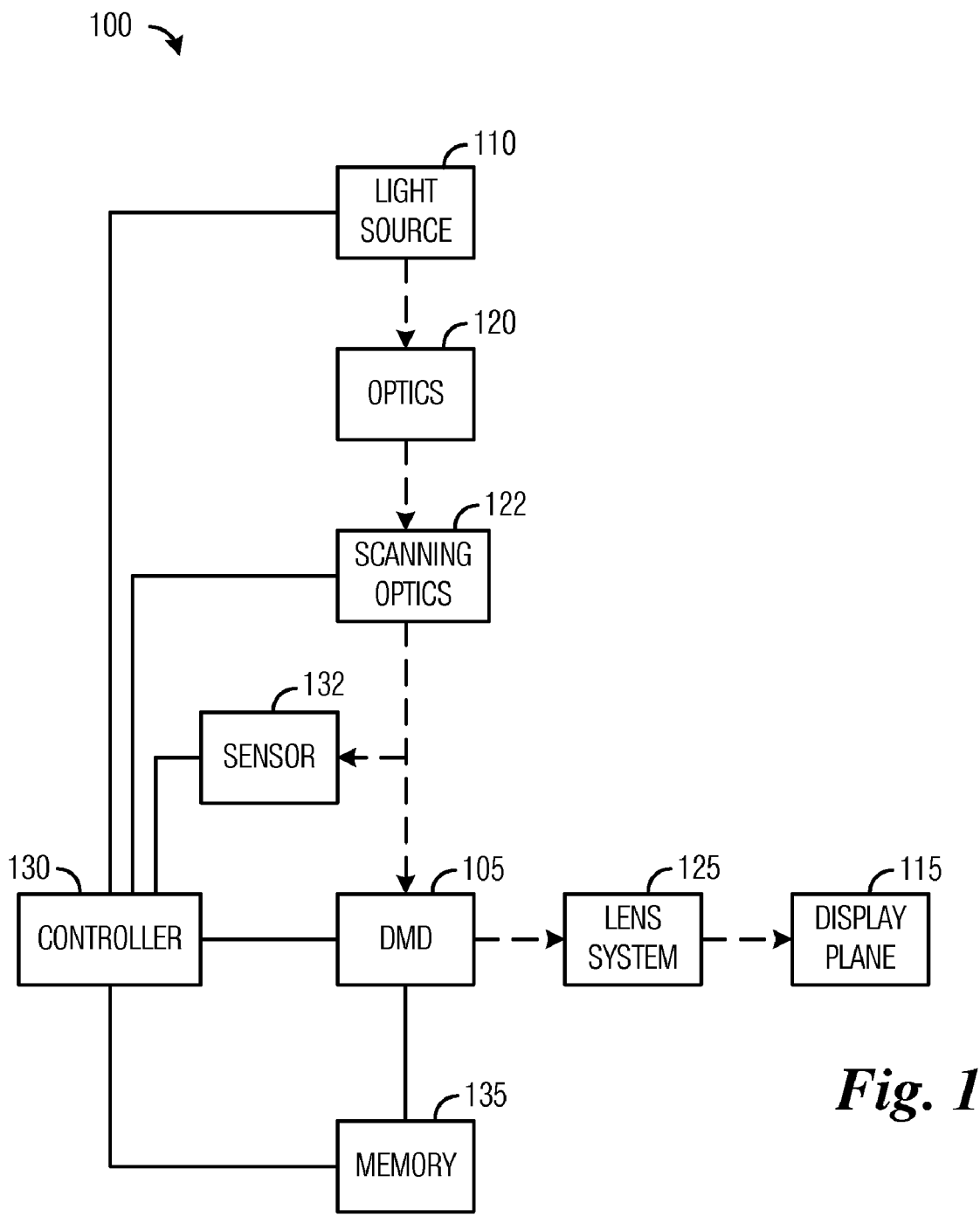
FIG. 1 is a block diagram of a projection display system in accordance with an embodiment.

Referring first to FIG. 1, there is shown a diagram illustrating a laser illuminated DMD-based projection display system 100 in accordance with an embodiment. The DMD-based projection display system 100 includes a DMD 105 that modulates light produced by a light source 110. The light source 110 may make use of multiple lasers to produce the desired color or colors of light, and may include the use of optical fiber to relay light from the lasers to other optical components of the system. Although the discussion focuses on solid-state lasers with low etendue, other sources of light, including filtered non-coherent light, free-electron lasers, and so forth, may be used in place of the solid-state lasers. Therefore, the discussion should not be construed as being limited to the present embodiments discussed herein.

The DMD 105 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array. Each light modulator in the microdisplay may operate in conjunction with the other light modulators in the microdisplay to modulate the light produced by the light source 110. The light modulated by the DMD 105 may be used to create images on a display plane 115. The DMD-based projection display system 100 also includes an optics system 120, which may be used to collimate the light produced by the light source 110. The DMD-based projection display system 100 may also include a lens system 125, which may be used to manipulate (for example, focus) or redirect the light reflecting off the DMD 105 toward the display plane 115.

The DMD-based projection display system 100 may also include a scanning optics unit 122 in its optical path. The scanning optics unit 122 may be used to scan light from the light source 110 over a surface of the DMD 105. Preferably, the scanning optics unit 122 allows for the simultaneous illumination of the DMD 105 with light of different colors.

The DMD 105 may be coupled to a controller 130, which may be responsible for loading image data into the DMD 105, controlling the operation of the DMD 105, providing micromirror control commands to the DMD 105, controlling the light produced by the light source 110, and so forth. A memory 135, which may be coupled to the DMD 105 and the controller 130, may be used to store the image data, as well as configuration data, color correction data, and so forth.

The DMD-based projection display system 100 may also include a sensor 132 to provide information related to the light produced by light source 110 and the scanning optics unit 122 to the controller 130, which may make use of the information to control the operation of the light source 110 and the scanning optics unit 122. The sensor 132 may be located in the optical path of the DMD-based projection display system 100 and directly convert light in the optical path into electrical information. Alternatively, an optical element, such as a neutral density filter, a coated or uncoated piece of glass, a mirror, or so forth, may be used to sample a fraction of the light in the optical path of the DMD-based projection display system 100 and direct the sample to the sensor 132.

The sensor 132 may be an opto-electric sensor, such as a charge-coupled device (CCD), CMOS optical sensor, and so forth, capable of converting light incident on its surface into electrical information, which may be processed by the controller 130. The controller 130 may make use of the electrical information to ensure that the light source 110 is producing light at desired color points, for desired durations, and so on. Additionally, the controller 130 may use the electrical information to determine if the scanning optics unit 122 is moving the light over the surface of the DMD 105 at the proper rate with proper spacing between the different colors of light, and so forth.

Figure 2:
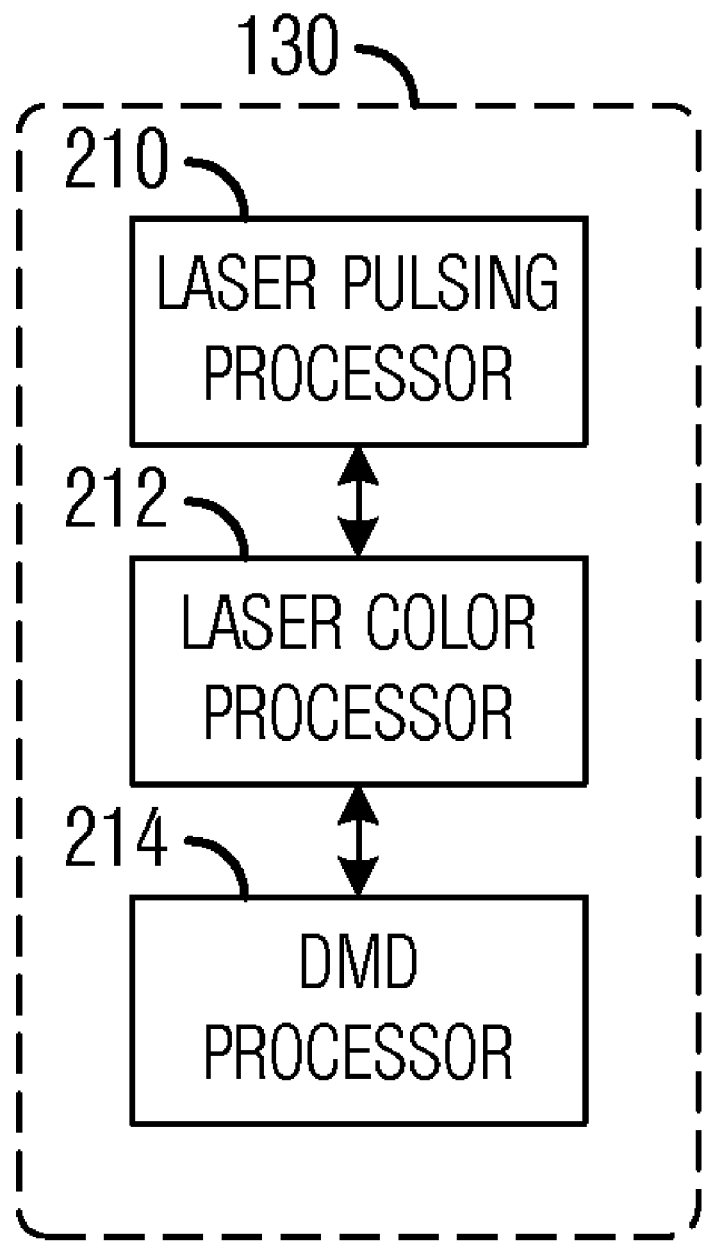
FIG. 2 is a block diagram of a controller for the projection display system in accordance with an embodiment.

FIG. 2 illustrates a detailed view of the controller 130 of FIG. 1 in accordance with an embodiment. The controller 130 includes a laser pulsing processor 210, a laser color processor 212, and a DMD processor 214. The laser pulsing processor 210 may be used to control real-time laser intensity and pulsing of the laser in the light source 110 (see FIG. 1). Additionally, the laser pulsing processor 210 may be used for laser interlock. The laser color processor 212 may be used for white-point control, temperature control, as well as calibration of the lasers in the light source 110. Furthermore, the laser color processor 212 may be used in conjunction with the laser pulsing processor 210 in laser interlock. The DMD processor 214 may be used to control the operation of the DMD 105 (see FIG. 1) as well as implementing techniques for improving image quality, such as enhancing brightness, image dynamic range, and so on. The DMD processor 214 may also be used to implement multi-view images as well as three-dimensional images. The controller 130 may be a single controller or multiple controllers.

Figure 3:
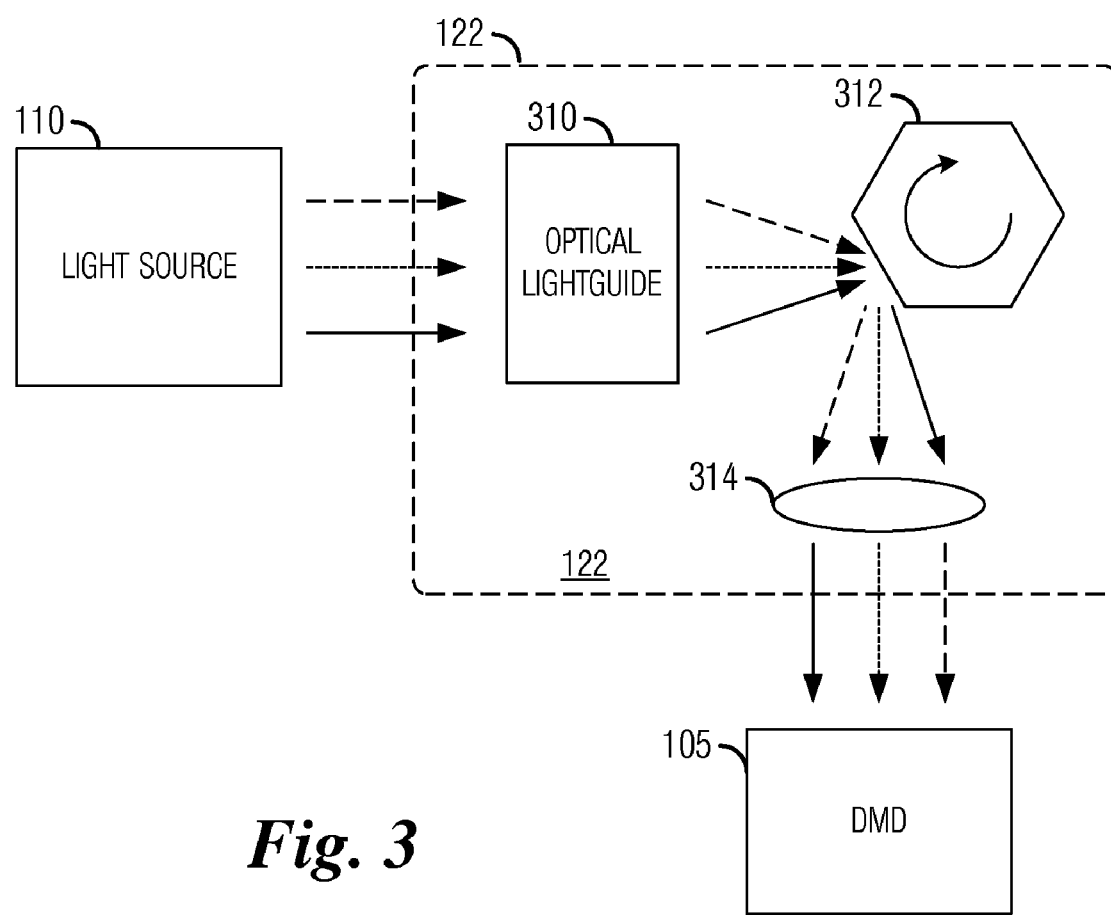
FIG. 3 is a diagram illustrating scanning optics in accordance with an embodiment.

FIG. 3 illustrates a detailed view of the scanning optics unit 122 of FIG. 1 utilizing a reflective surface in accordance with an embodiment. Generally, the scanning optics unit 122 includes an optical lightguide 310, a reflective scanning element 312, and an optical element 314. The optical lightguide 310 receives light from the light source 110 and shapes the light to present a uniform line of light to the reflective scanning element 312, which redirects the light to the optical element 314 for presentation to the DMD 105. It should be noted that other optical elements, such as lens, mirrors, or the like, may be positioned between the light source and the optical lightguide, or between the optical lightguide 310 and the reflective scanning element 312, to further shape, condition, or direct the light. For example, in an embodiment, a lens may be glued or cemented directly to the optical lightguide 310.

In an embodiment, the reflective scanning element 312 comprises a rotating element having reflective surfaces, such as a polygon-shaped mirror as illustrated in FIG. 3. A polygon mirror may be a disk having substantially flat reflective surfaces or faces arranged along an outer edge of the disk such that the flat surfaces are parallel with a rotational axis running through a center of the disk.

The reflective scanning element 312 may be rotated by an electric motor and as the reflective scanning element 312 rotates around the rotational axis, the individual reflective surfaces cause the individual colored light beams to scan across the surface of the DMD 105. The rotational axis may be orthogonal to the light path of the DMD-based projection display system 100 (see FIG. 1) as well as a direction of the scanning of the light. The reflective scanning element 312 preferably has a large number of reflective surfaces, such as four or more, or as shown in FIG. 3, six reflective surfaces. The higher the number of reflective surfaces allows the reflective scanning element 312 to be rotated as rapidly as a similar scan optics element with a lower number of reflective surfaces.

Furthermore, the rate of rotation of the reflective scanning element 312 may be altered to produce different light scan rates. For example, by increasing the rate of rotation, the light scan rates may be increased, while the light scan rate may be decreased by decreasing the rate of rotation of the reflective scanning element 312. It should be noted that in the embodiment illustrated in FIG. 3 utilizes a single scanning element, and accordingly, changes to the rate of rotation affects each of the different lights equally.

Figure 4:
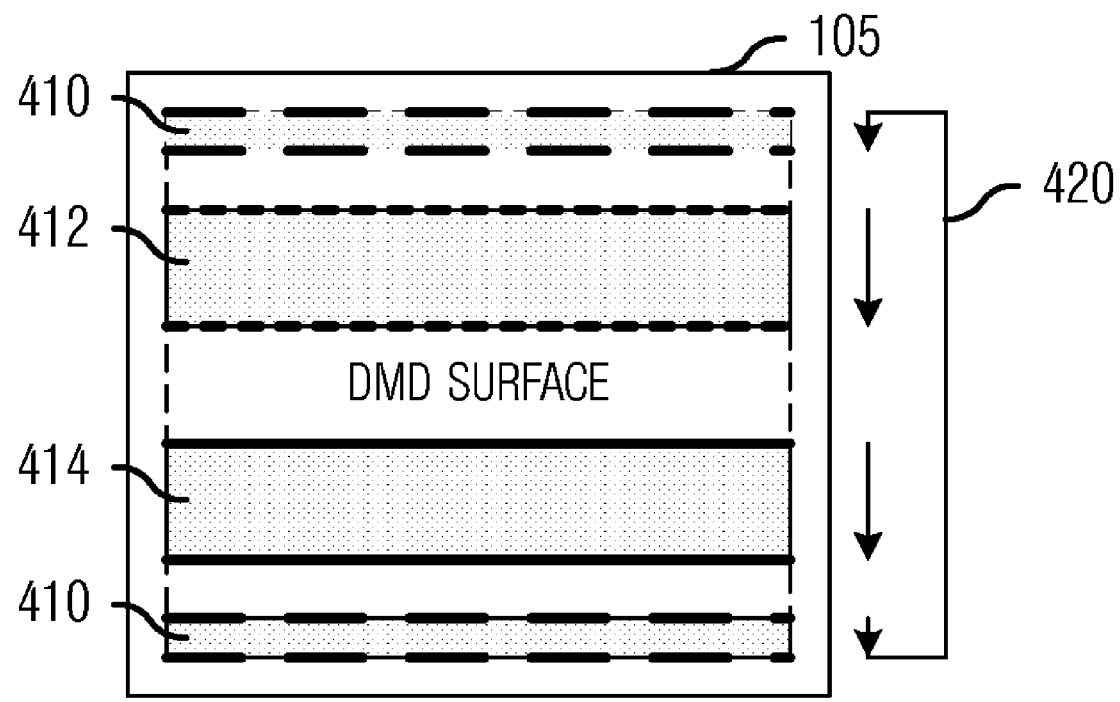
FIG. 4 is a diagram of light beams scanned over the surface of a DMD in accordance with an embodiment.

FIG. 4 illustrates the movement of scanning lines over a top surface of the DMD 105 in accordance with an embodiment. In particular, FIG. 4 illustrates the top surface of the DMD 105 during the illumination of three separate beams of light, such as, for example, a red colored light (shown as dashed light beam 410) illuminating a top portion of the surface of the DMD 105, a green colored light (shown as dotted light beam 412) illuminating a middle portion of the surface of the DMD 105, and a blue colored light (shown as solid light beam 414) illuminating a bottom-middle portion of the surface of the DMD 105.

Furthermore, a bottom portion of the surface of the DMD 105 is illuminated by a part of the dashed light beam 410, representing the red colored light. This represents an embodiment in which as a color scrolls off the bottom of the DMD 105, the same color scrolls onto the top of the DMD 105, as illustrated by reference numeral 420. By simultaneously illuminating the surface of the DMD 105 with light of different colors enables a higher duty cycle for the laser light sources in the light source 110 and thereby increases the brightness of the images produced by the DMD-based projection display system 100.

Figure 5:
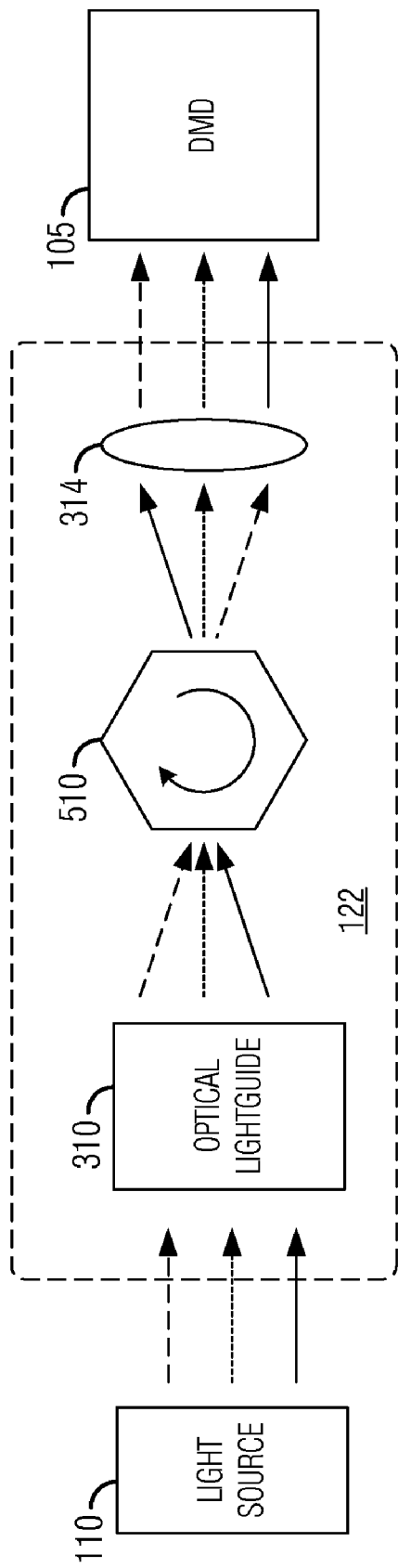
FIGS. 5-7 are diagrams illustrating scanning optics in accordance with other embodiments.

FIG. 5 illustrates another embodiment of the scanning optics unit 122 in which a refractive scanning element 510 is utilized to scan light from the light source 110 over the surface of the DMD 105. Unlike the reflective surface used in the scanning optics unit 122 illustrated in FIG. 3, the scanning optics unit 122 shown in FIG. 5 uses the refractive scanning element 510, such as a faceted prism or a diffractive optical element, to scan light from the light source 110 over the surface of the DMD 105. Similar to the reflective scanning element 312 discussed above with reference to FIG. 3, the refractive scanning element 510 may comprise a disk with multiple, substantially flat surfaces along the outer edge as illustrated in FIG. 5. The refractive scanning element 510, however, permits light to pass through rather than reflecting the light and bends the light as it passes through, thereby scanning the light across the surface of the DMD 105 as it is rotated. The refractive scanning element 510 may be coated with an antireflective coating to help reduce light loss due to reflection.

Figure 6:
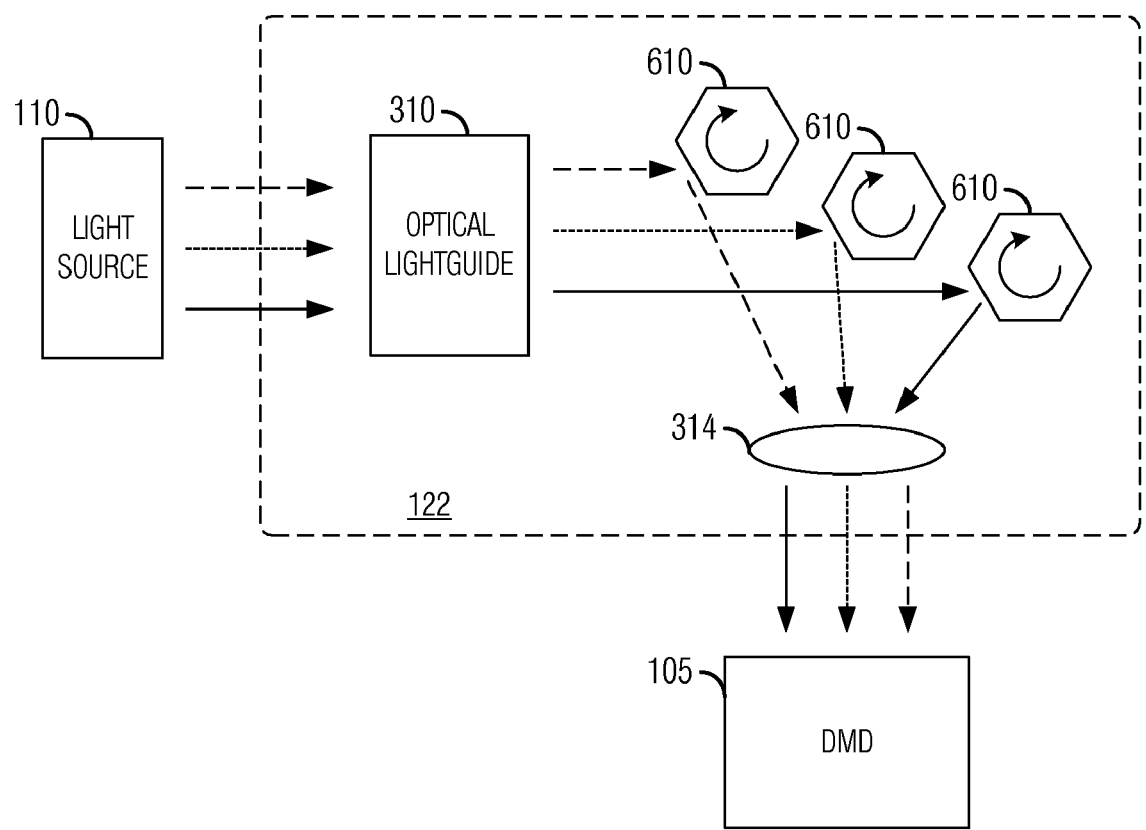
Figure 7:
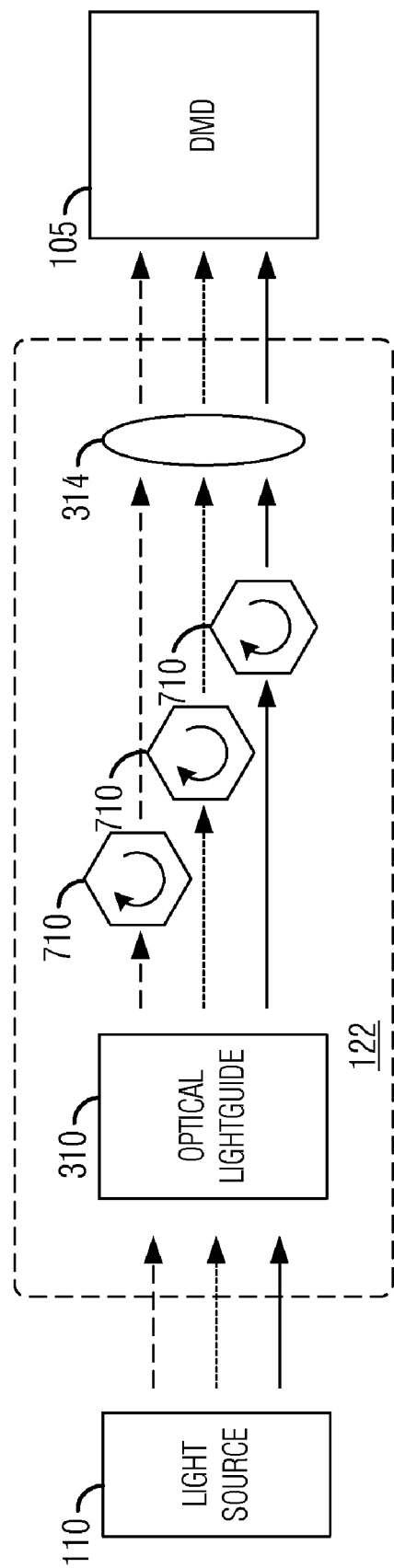

FIGS. 6 and 7 illustrate additional embodiments in which the scanning optics unit 122 comprises a reflective or refractive element, respectively, for each color. Referring first to FIG. 6, an embodiment of the scanning optics unit 122 having reflective scanning elements 610, wherein each of the reflective scanning elements 610 may be configured as the reflective scanning element 312 of FIG. 3, except that each reflective scanning element 610 is configured to reflect light of a subset of the colors. In the embodiment illustrated in FIG. 6, the scanning optics unit 122 is configured such that the reflective scanning elements 610 may reflect three colors or groups of colors individually.

FIG. 7 illustrates an embodiment in which the scanning optics unit 122 comprises multiple refractive scanning elements 710, wherein each of the refractive scanning elements 710 may be configured as the refractive scanning element 510, except that each of the refractive scanning elements 710 is configured to redirect the light of a subset of the colors. In the embodiment illustrated in FIG. 7, the scanning optics unit 122 is configured such that the refractive scanning elements 710 may scan three colors or groups of colors individually.

It should be noted that the reflective scanning elements 610 and the refractive scanning elements 710 of FIGS. 6, and 7, respectively, may be configured to redirect a group of colors, such as a group of colors of light that may be simultaneously incident on the surface of the DMD 105. For example, if the light source 110 produces seven (7) different colors of light, but only three different colors of light may be simultaneously incident on the surface of the DMD 105 at any given time, then there may only be a need for three reflective scanning elements 610 and/or refractive scanning elements 710.

It should also be noted that each of reflective/refractive elements may be rotated at a different rate to impart a different scan rate to each color of light. Additionally, in certain applications, it may be useful to purposely superimpose different colors of light to create a color of light not ordinarily producible by the light source 110. For example, multiple primary colors may be superimposed to create a secondary color of light or a white light.

An application of individual scan rates for different colors of light may be used to enhance a dynamic range of the DMD-based projection display system 100 by rapidly (or slowly) scanning a color of light over the surface of the DMD 105 while keeping scan rates for other colors of light relatively constant.

Furthermore, each reflective/refractive scanning element may be identical, having the same general physical characteristics, such as shape, size, number of facets, and so forth, or alternatively, some or all scan reflective/refractive elements may have different physical characteristics, such as different sizes, numbers of facets, and so on.

Figure 8A:
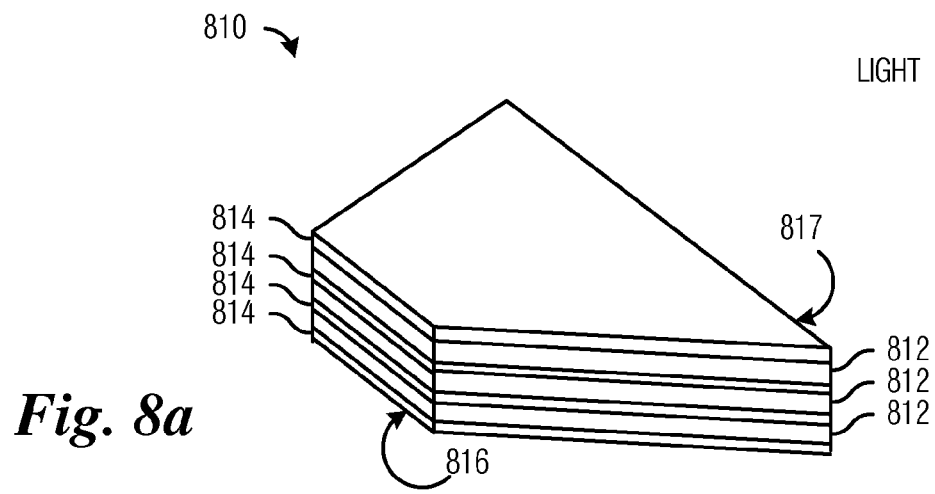
FIGS. 8a and 8b are perspective views of optical lightguides in accordance with an embodiment.
Figure 8B:
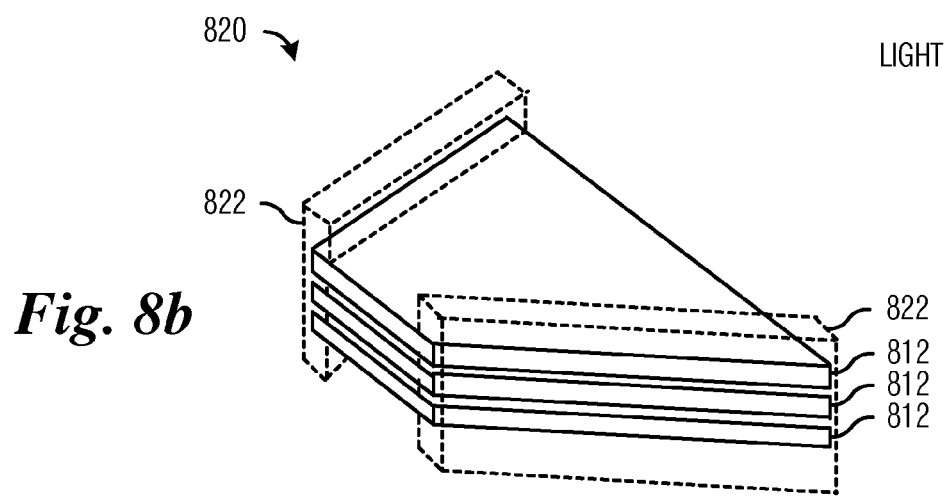

FIGS. 8a and 8b illustrate perspective views of optical lightguides 810 and 820, respectively, that may be used as the optical lightguide 310 discussed above. It should be noted that the optical lightguides illustrated in FIGS. 8a and 8b are designed for three light sources, but other embodiments may be designed for more or fewer light sources.

Referring first to FIG. 8a, the optical lightguide 810 comprises lightguide layers 812 interposed between cladding layers 814. The lightguide layers 812 are formed of a material having a higher index of refraction than the cladding layers 814. The difference between the refractive indexes of the lightguide layers 812 and the cladding layers 814 can be small, such as about 0.02. In this manner, light entering the lightguide layers 812 and striking the interface between the lightguide layers 812 and the cladding layers 814 at an angle of incidence greater than the critical angle is reflected back into the lightguide layers 812. The optical lightguide 810 is preferably planar to achieve a line shape; however, other embodiments may have other shapes, including curved or non-planar shapes, to illuminate other patterns on the DMD 105.

In an embodiment in which a red, blue, and green laser light source is utilized, the lightguide layers 812 may be formed of crown glasses, such as BK7 having an index of refraction of about 1.55, and have a thickness from about 500 microns (or about the diameter of the optical fiber) to about 2 to 3 mm. These thicknesses may vary depending on the DMD height to be scrolled and optical relay magnification. The entrance face and the exit face, indicated by reference numerals 816 and 817, respectively, are preferably coated with an anti-reflective coating. The tapered sidewalls are preferably polished with or without an anti-reflective coating. The cladding layers 814 preferably have a thickness greater than about 10 times the wavelength guided through the lightguide layers 812 to reduce evanescent wave and cross talk between the lightguide layers 812 and be formed of, for example, crown glasses, such as K10, which has an index of refraction of about 1.5 (lower than the index of refraction of the lightguide layers 812). In an embodiment, the lightguide layers 812 have a thickness from about $\frac{1}{15}^{th}$ of the DMD height (times the optical relay magnification) or about 0.5 mm to about 1 mm or more.

The optical lightguide 820 illustrated in FIG. 8b is similar to the optical lightguide 810 illustrated in FIG. 8a, except that air is utilized as the cladding layers 814. Because air is used as the cladding layers, additional supports (illustrated in FIG. 8b by reference numeral 822) may be necessary to properly align the lightguide layers 812. Preferably, the supports 822 are formed of a material such that little or no frustration of total internal reflection (TIR) and losses and/or non-uniformity occurs. Accordingly, it is preferred that the supports 822 be formed of a material such as those discussed above with reference to the cladding layers 814.

Figure 8C:
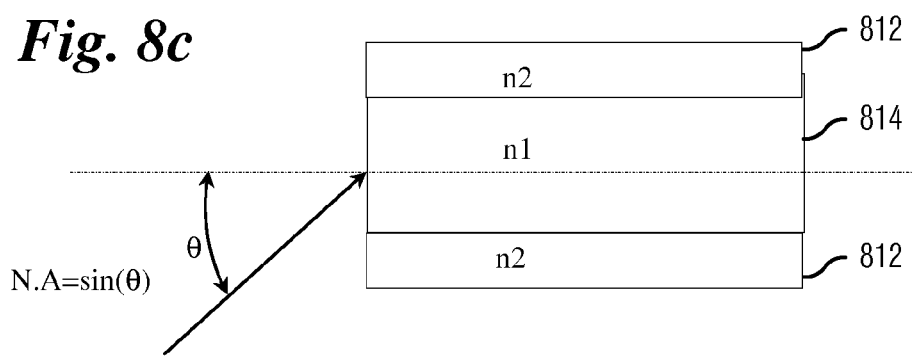
FIG. 8c is a diagram illustrating reflective properties of an optical lightguide in accordance with an embodiment.

FIG. 8c and the following equation illustrate the conditions for the propagation of light through the lightguide layers 812 in accordance with an embodiment. In particular, FIG. 8c illustrates light being received at an angle θ relative to the optical axis of the lightguide layer 812. The lightguide layer 812 has a refractive index n1 and the material of the cladding layer 814 has a refractive index of n2. In this situation, the $$\sin(\theta) = N.A.(\lambda, n1, n2) = \sqrt{n1(\lambda)^2 - n2(\lambda)^2}$$

Where λ is the wavelength of the light being projected through the lightguide;
θ is the angle of incidence of the light on the entrance face of the lightguide;
n1 is the refractive index of the material of the lightguide;
n2 is the refractive index of the material adjacent to the lightguide; and
N.A. is the numerical aperture.

It should be noted, however, that designs and implementations should also consider spectral transmission and thermal issues. With reference to spectral transmission, it is known that some energy from a light source being transmitted through a material may be absorbed as indicated by Beer-Lambert's law. The absorption of the energy is dependent upon, among other things, the type of material and the wavelength of the light being transmitted therethrough. For example, for the transmission of blue light having a wavelength of 400-450 nm, it may be desirable to use a material such as a crown glass having a refraction index of about 1.5 to about 1.6 to reduce absorption, rather than a flint glass having a refraction index of about 1.75 or higher that would exhibit elevated levels of absorption. A fused silica, which exhibits good transmission in UV wavelengths, may also be used.

Regarding thermal issues, the lightguide layer 812 (stacked or unstacked) may generate sufficient heat to cause the lightguide layer 812 to fail by, for example, cracking. As a result, it may be desirable to utilize a design such that sufficient cooling is provided for the lightguide layers 812. In an embodiment, the cladding layer 814 is formed of a optically insulating material having not only a sufficient refractive index as discussed above, but also exhibits good heat conductivity properties. In this manner, the cladding layer 814 may be used to conduct heat away from the lightguide layers 812. By the same effect the lightguide material could be picked to absorb UV or IR to help for filtering the source of parasitic spectral component.

For example, in an embodiment the lightguide layers 812 are formed of pyrex having a refractive index of about 1.478 and a coefficient of thermal expansion (CTE) of about 3E-6 is utilized with cladding layers 814 formed of fused silica having a refractive index of about 1.46 and a CTE of about 0.55E-6. In this embodiment, copper or other material having good thermal conductivity properties may be adjacent to the fused silica to further conduct heat away from the lightguide. This type of embodiment may be particularly well suited for applications utilizing beams having strong infrared or ultraviolet spectral content, such as a lamp-based illumination light engine.

In another embodiment, water may be used as a cladding layer 814. Water has a refractive index of about 1.33, which is sufficient to act as a cladding layer 814. A pump may be used to flow the water through a cooling system, thereby conducting the heat away from the lightguide layer 812.

Figure 9:
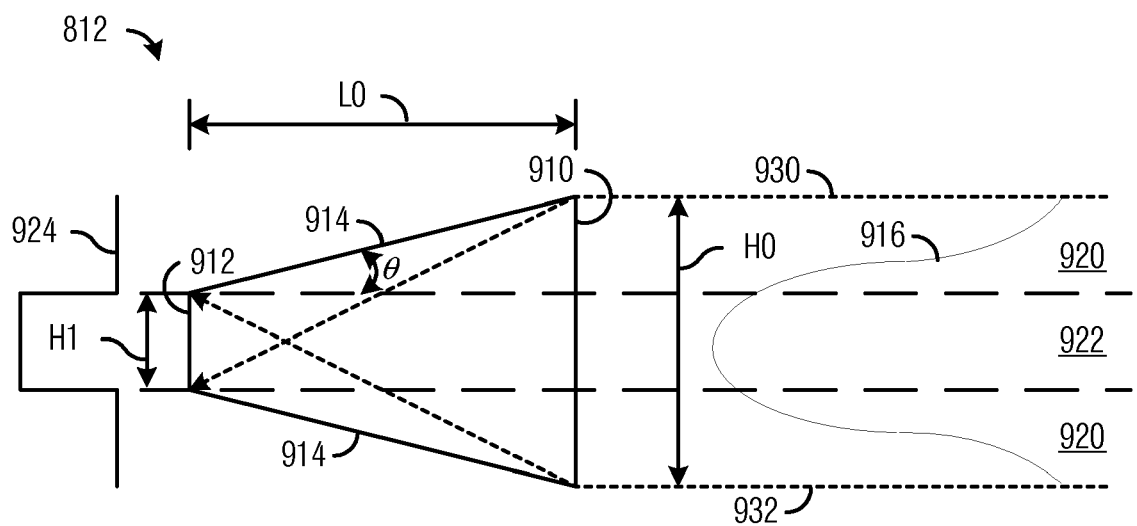
FIG. 9 is a plan view illustrating the operation of an optical lightguide in accordance with an embodiment.

FIG. 9 illustrates a top view of one of the lightguide layers 812 in accordance with an embodiment. The lightguide layers 812 are preferably shaped as an isosceles trapezoid wherein the longer of the parallel sides acts as an entrance face 910 and the shorter of the parallel sides acts as an exit face 912. Sidewalls 914 of the isosceles trapezoid-shaped lightguide layers 812 create a tapering from the entrance face 910 to the exit face 912. In an embodiment, the ratio of a height H0 of the entrance face 910 to a height H1 of the exit face 912 is about 3, and $\cos(\theta)$ is less than about the inverse of the refractive index (e.g., 1/n, where n is the refractive index).

Furthermore, as indicated by the curve 916, the intensity of the light on the entrance face 910 preferably has a Gaussian-like (or Lambertian) distribution wherein the peak of the intensity curve is centered on the entrance face 910 and tapers off towards the edges. It should be noted that in this embodiment it is not necessary for the intensity to taper off to zero at the edges nor is it necessary for the far-field distribution to be exactly Gaussian in shape. For purposes of illustration, the optical lightguide 812 illustrated in FIG. 9 has been divided into three sections—two sideband sections 920 and a center section 922. As indicated by the ray lines 930 and 932, the tapering of the sidewalls 914 causes light entering the lightguide 812 in the two sideband sections 920 to be redirected to the center section 922. As a result, the light from the sidebands 920 is added to the center section 922, thereby creating more of a top-hat distribution of intensity on the exit face 912 as indicated by intensity curve 924.

Figure 10A:
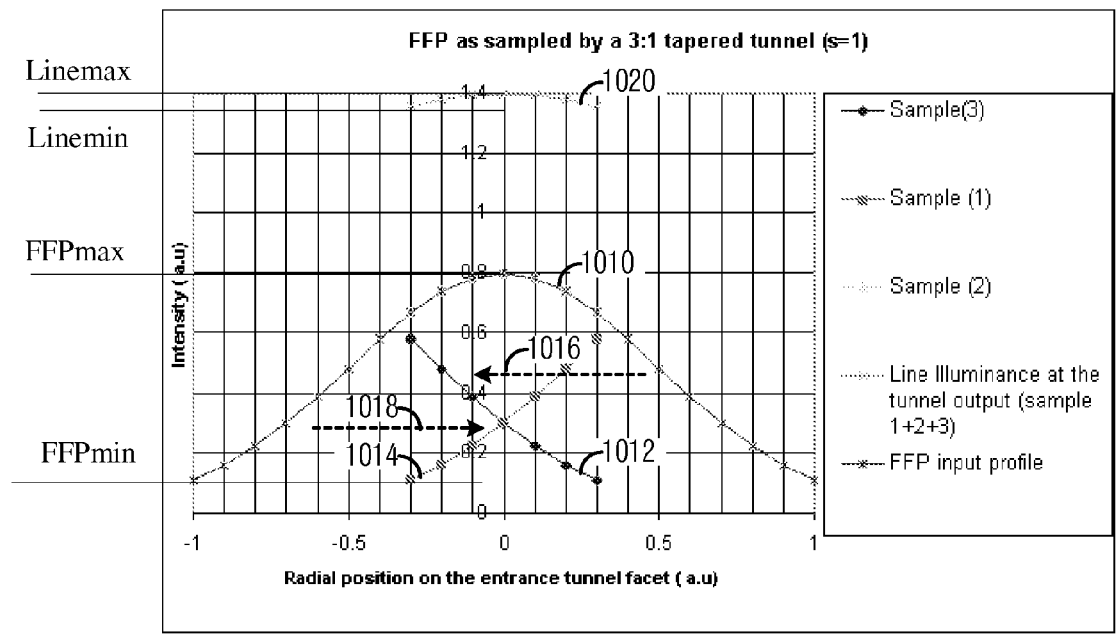
FIGS. 10a and 10b are plots illustrating the effect of an optical lightguide in accordance with an embodiment.

FIG. 10a further illustrates the effect of the tapered sidewalls on the intensity at the exit face 912 in accordance with an embodiment. Line 1010 represents the intensity of the far field pattern on the entrance face 910. As discussed above, line 1010 is a Gaussian distribution in which the minimum intensity is $FFP_{min}$ (far field pattern) and the maximum intensity is $FFP_{max}$. Lines 1012 and 1014 represent the redirection of light entering the entrance face 910 along the sideband sections 920 to the center section 922. In particular, line 1012 represents the redirection of the intensity along the right portion of the Gaussian distribution to the center section 922 as indicated by the dotted line 1016, and line 1014 represents the redirection of intensity along the left portion of the Gaussian distribution to the center section 922 as indicated by the dotted line 1018. As a result, the center of the Gaussian distribution curve is added to the redirected light as indicated by the lines 1012 and 1014 to achieve the intensity distribution on the exit face 912 indicated by line 1020. As one of ordinary skill in the art will appreciate, the intensity distribution represented by line 1020 is much more uniform, thereby allowing a uniform scanning line to be presented to the DMD.

Figure 10B:
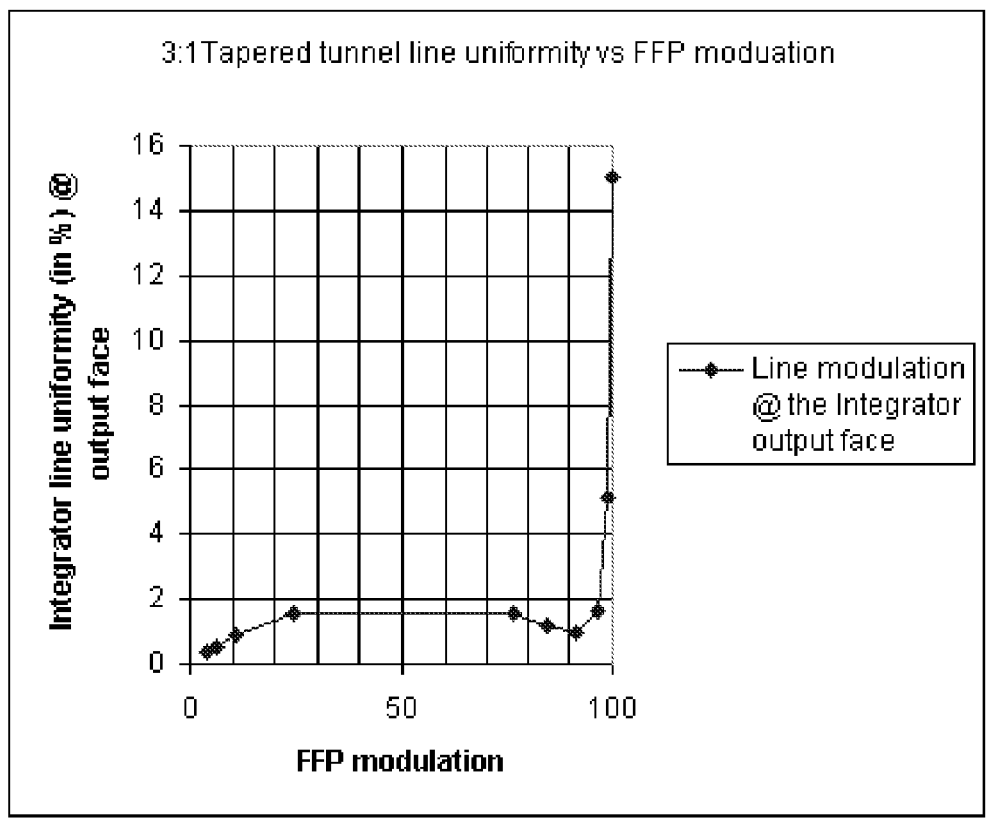

FIG. 10b is a plot of the line uniformity modulation versus the far field pattern modulation in accordance with an embodiment. The FFP modulation, as a percent, is given by the following equation.

$$FFPModulation = \frac{FFP_{max} - FFP_{min}}{FFP_{max} + FFP_{min}} * 100$$

wherein: $FFP_{max}$ is the maximum intensity on the entrance face; and $FFP_{min}$ is the minimum intensity on the entrance face.

The FFP modulation represents the variation of the intensity on the entrance face. A small FFP modulation value represents a flatter intensity curve, while a larger FFP modulation value represents larger variation between the intensity in the center region as compared to the sidebands.

The line uniformity modulation (LUM), as a percent, is given by the following equation.

$$LUM = \frac{Line_{max} - Line_{min}}{Line_{max} + Line_{min}} \times 100$$

wherein: $Line_{max}$ is the maximum intensity on the exit face; and $Line_{min}$ is the minimum intensity on the exit face.

As can be seen from the above equation, the smaller the value of LUM, the more uniform the intensity is over a length of the line at the exit face, and the more desirable the line is for use in scanning over a DMD.

Figure 11A:
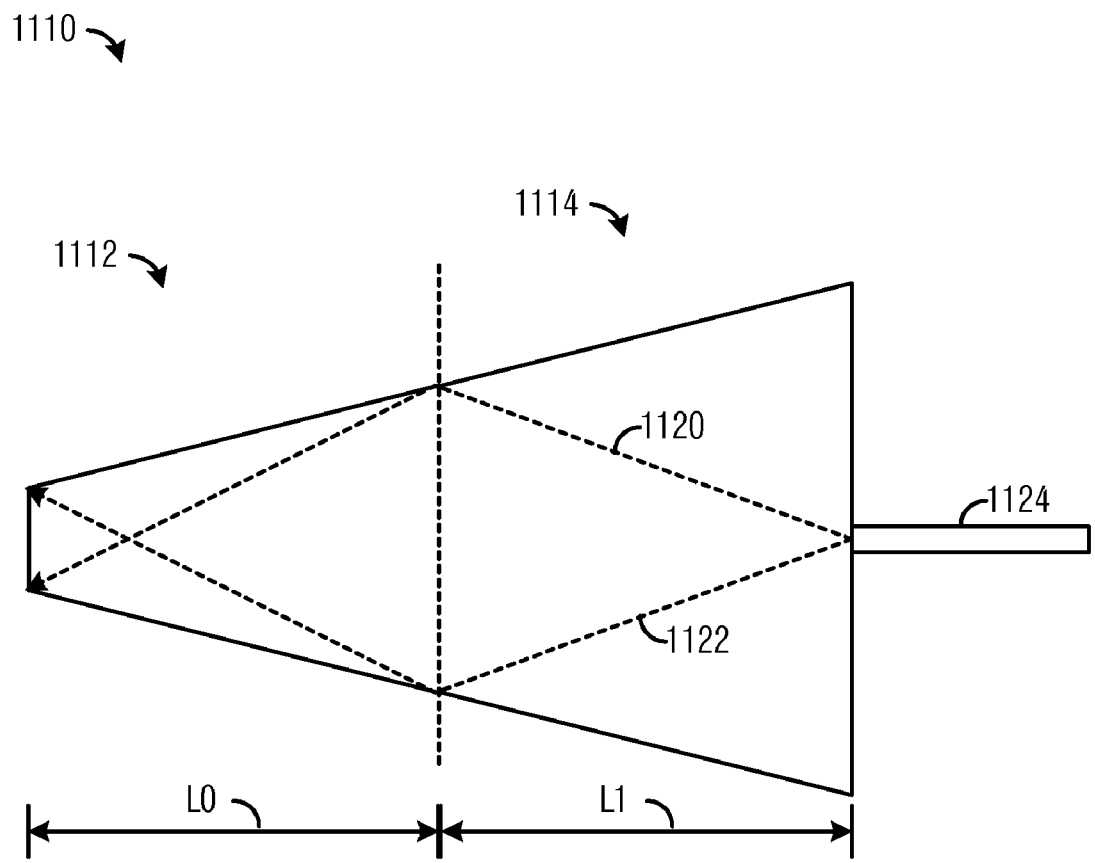
FIGS. 11a and 11b are plan views of other optical lightguides in accordance with other embodiments.
Figure 11B:
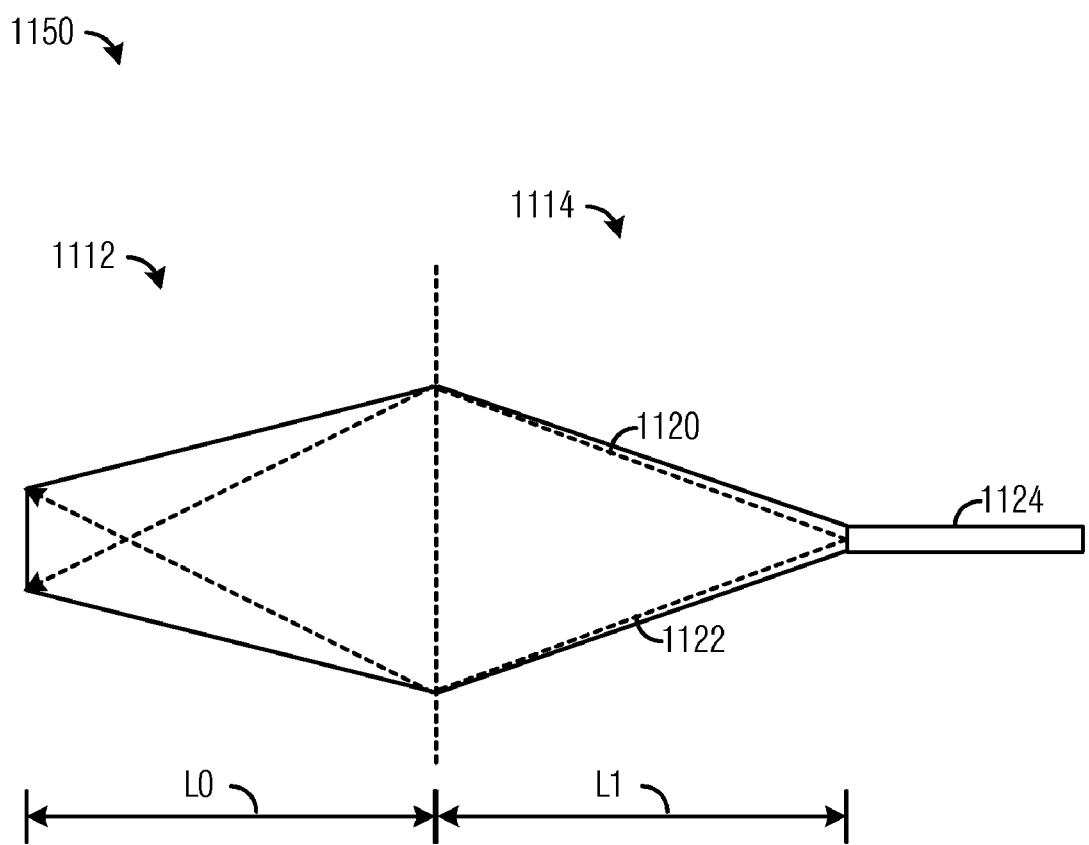

As can be seen from FIG. 10b, embodiments such as those discussed herein may be utilized to achieve much smaller LUM over a wide range of FFP modulations. Studies have indicated that an LUM of about 1.6% may be obtained with a FFP modulation as great as about 95% at the entrance face. It should be noted that the right edge of the plot is due in part to the FFP input profile modulation becomes too high (100%) to provide a sufficient uniformity FIGS. 11a and 11b illustrate other embodiments of a lightguide. The intensity of the far field pattern on the entrance face of the lightguide is preferably an extended Gaussian distribution such that the gaussian profile lateral dimension is of the same order of magnitude of the line to be generated. In order to obtain this Gaussian distribution, the optical lightguide 812 illustrated in FIG. 9 may be extended as illustrated by optical lightguide 1110 of FIG. 11a. The isosceles trapezoid shape of the optical lightguide 812 is extended along the tapered sidewalls. For purposes of illustration, the optical lightguide 1110 is divided into a first section 1112 and a second section 1114. The shape and size of the first section 1112 may be substantially similar to the optical lightguide 812. The second section 1114 represents an extension to the optical lightguide 812 along the optical axis. In this manner, some of the light rays, such as light rays 1120 and 1122, from a light source, such as an optical fiber 1124, is defocused and redirected from the light source to the tapered sidewalls of the lightguide. The defocusing and redirecting creates a Gaussian distribution along the entrance face of the first section 1112, which represents the entrance face of the optical lightguide 812 of FIG. 8. The second section 1114 may be formed of a different material and have a different index of refraction than the first section 1112. The shape can also be different (rectangular, cylindrical, or other) as long as the beam is freely propagated along L1 with little or no reflection.

FIG. 11b illustrates an optical lightguide 1150 in which corners of the optical lightguide 1110 of FIG. 11a have been removed. As one of ordinary skill in the art will realize, little or no light is reflected along the tapered edges of the extended section of the lightguide 1110. Accordingly, in an embodiment, the extended section of the lightguide 1150 is trimmed along the tapered edges of the extended section, thereby creating a smaller footprint and using less material. A length of the extended section, represented by L1 in FIGS. 11a and 11b, is preferably such that the intensity profile presented to the first section 1112 is a Gaussian profile.

The embodiments illustrated in FIGS. 11a and 11b have the additional advantage that the optical fiber 1124 may be connected directly to the lightguide by, for example, optical glue or other mechanical coupling. Unlike some other embodiments that may require additional components and/or alignment to shape and position the light for the optical lightguide, the embodiments illustrated in FIGS. 11a and 11b may be connected directly to the optical lightguide without the need for intermediate components. This may further reduce the manufacturing complexity and costs.

Figure 12A:
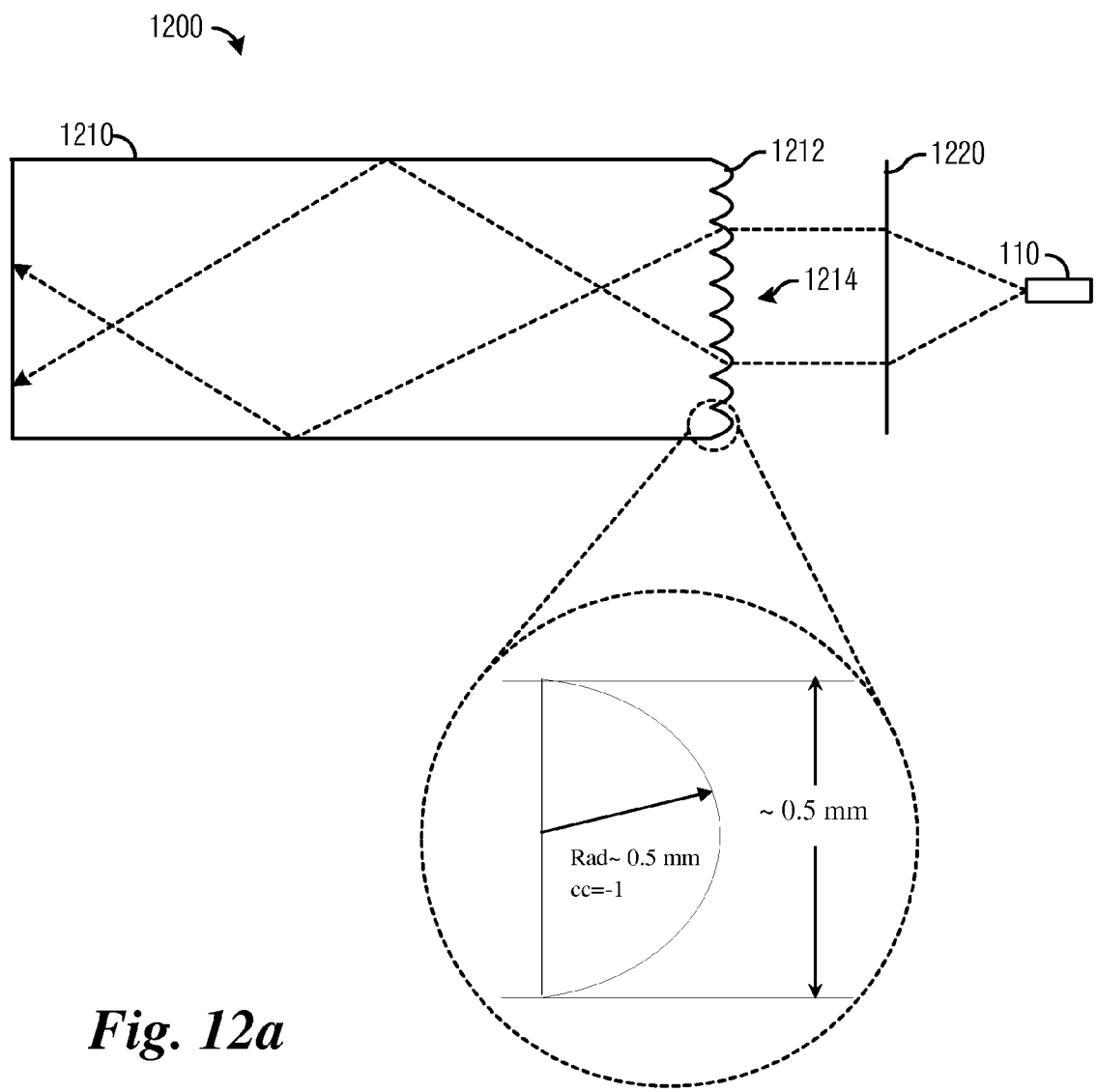
FIGS. 12a and 12b illustrate other optical lightguides in accordance with other embodiments.

FIG. 12a illustrates a lightguide 1200 in yet another embodiment. The lightguide 1200 comprises a rectangular light tunnel 1210 having a rectangular cross section with a lenticular array 1212 along an entrance face 1214. The lenticular array 1212 may be an integral part of the rectangular light tunnel 1210 or may be affixed to the light tunnel, such as by optical glue. In a preferred embodiment, the light presented to the lenticular array 1212 is a collimated, multi-mode light source, and accordingly, it may be desirable to include one or more optical elements, collectively represented by reference numeral 1220 in FIG. 12a, to shape and collimate light from the light source 110. As illustrated in FIG. 12a, in an embodiment the lenticular array 1212 comprises conic sections having a radius of about 0.5 mm and having a conic constant of about −1.0. Other embodiments may use different values.

Figure 12B:
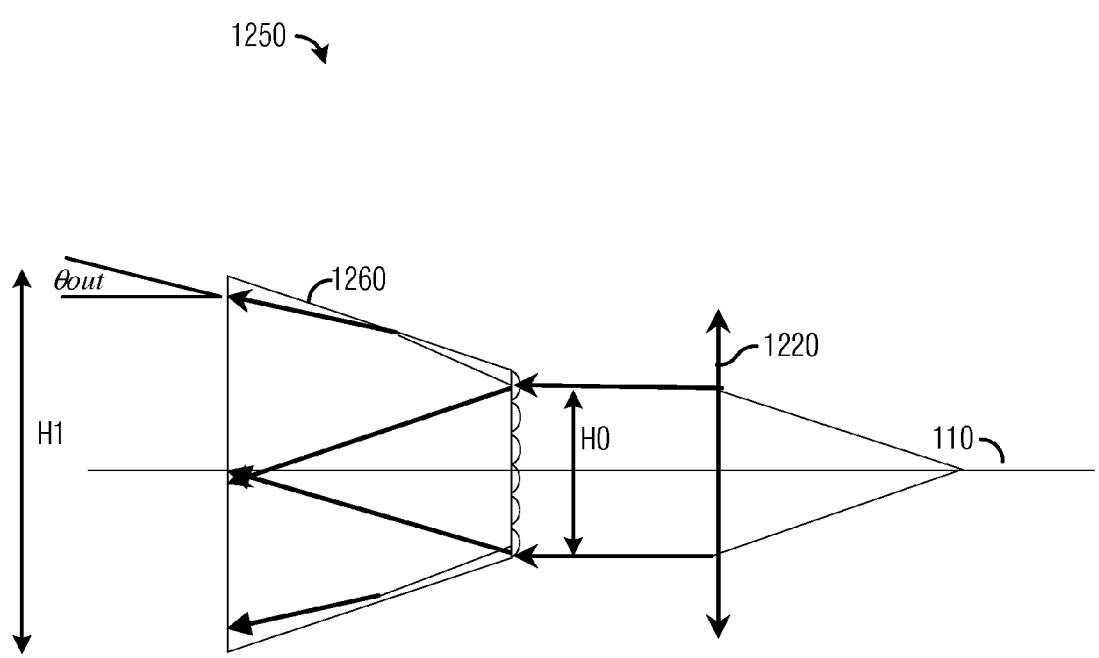

FIG. 12b illustrates a lightguide 1250 similar to the lightguide 1200 of FIG. 12a, except that a light tunnel 1250 of FIG. 12b is tapered. One of ordinary skill in the art will appreciate that in some embodiments of the lightguide illustrated in FIG. 12a may result in a slight loss of etendue. In embodiments in which the loss of etendue is too great, it may be desirable to taper the rectangular light tunnel 1210 as illustrated by the light tunnel 1260 in FIG. 12b to reduce the loss of etendue. In an embodiment, the amount of tapering is determined such that the following relationship is accurate.

$$\sin(\theta out) = \left(\frac{1}{2}\right) * \left(\frac{H0}{H1}\right) * \left(\frac{h}{f}\right)$$

wherein: θout is the angle in air between normal to the exit face to the exit ray;
H0 is the height of the entrance face;
H1 is the height of the exit face;
h is the height of each individual lens of the lenticular array; and
f is the focal length of each individual lens of the lenticular array.

It has been found that using the lenticular array in combination with the light tunnel may allow the length of the light tunnel to be reduced at least less than 18% of a light tunnel without a lenticular array. For example, studies have shown that a light tunnel with a lenticular array having a length of about 25 mm may achieve about the same intensity distribution as a light tunnel without a lenticular array having a length of about 140 mm.

The lightguides illustrated in 12a and 12b may be layered similarly to the lightguides illustrated in FIGS. 8a and 8b to shape light of differing colors.

Figure 13A:
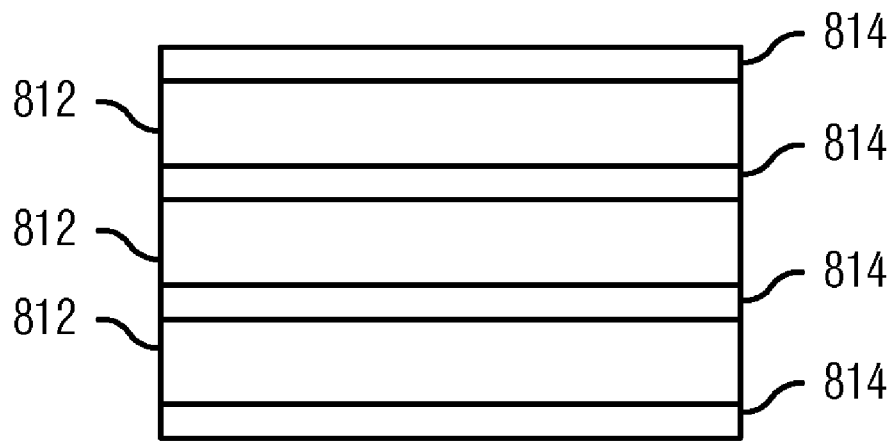
FIGS. 13a and 13b illustrate entrance and exit faces of optical lightguides in accordance with an embodiment.
Figure 13B:
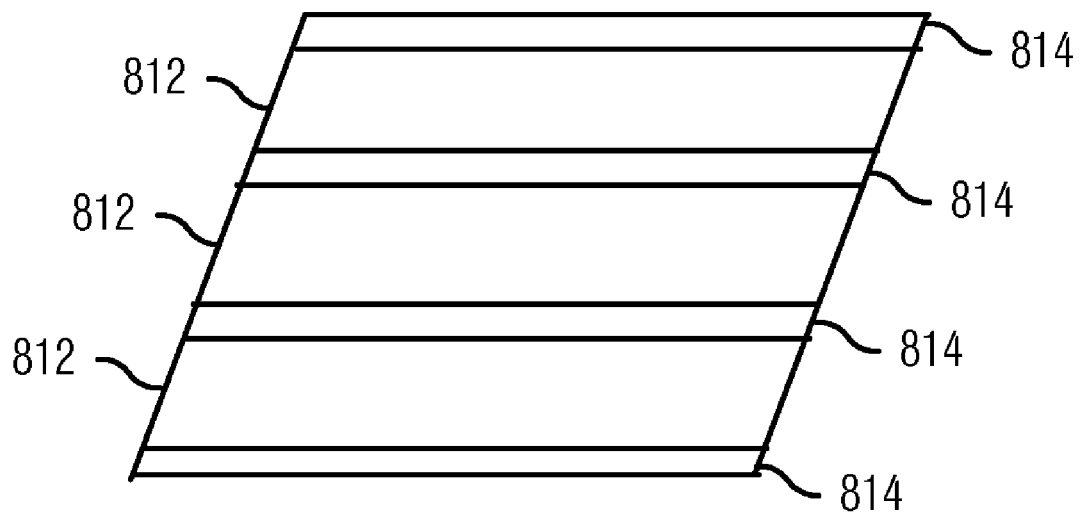

FIGS. 13a and 13b illustrate shapes of the entrance and exit faces of the lightguides discussed above. Referring first to FIG. 13a, the entrance face and the exit face has substantially rectangular shapes such that the edges are perpendicular to each other. In the embodiment illustrated in FIG. 13b, entrance face and the exit face have non-rectangular shapes, such as the parallelogram shape illustrated in FIG. 13b. It should be noted that the other shapes, including other parallelograms, may also be used.

Figure 14:
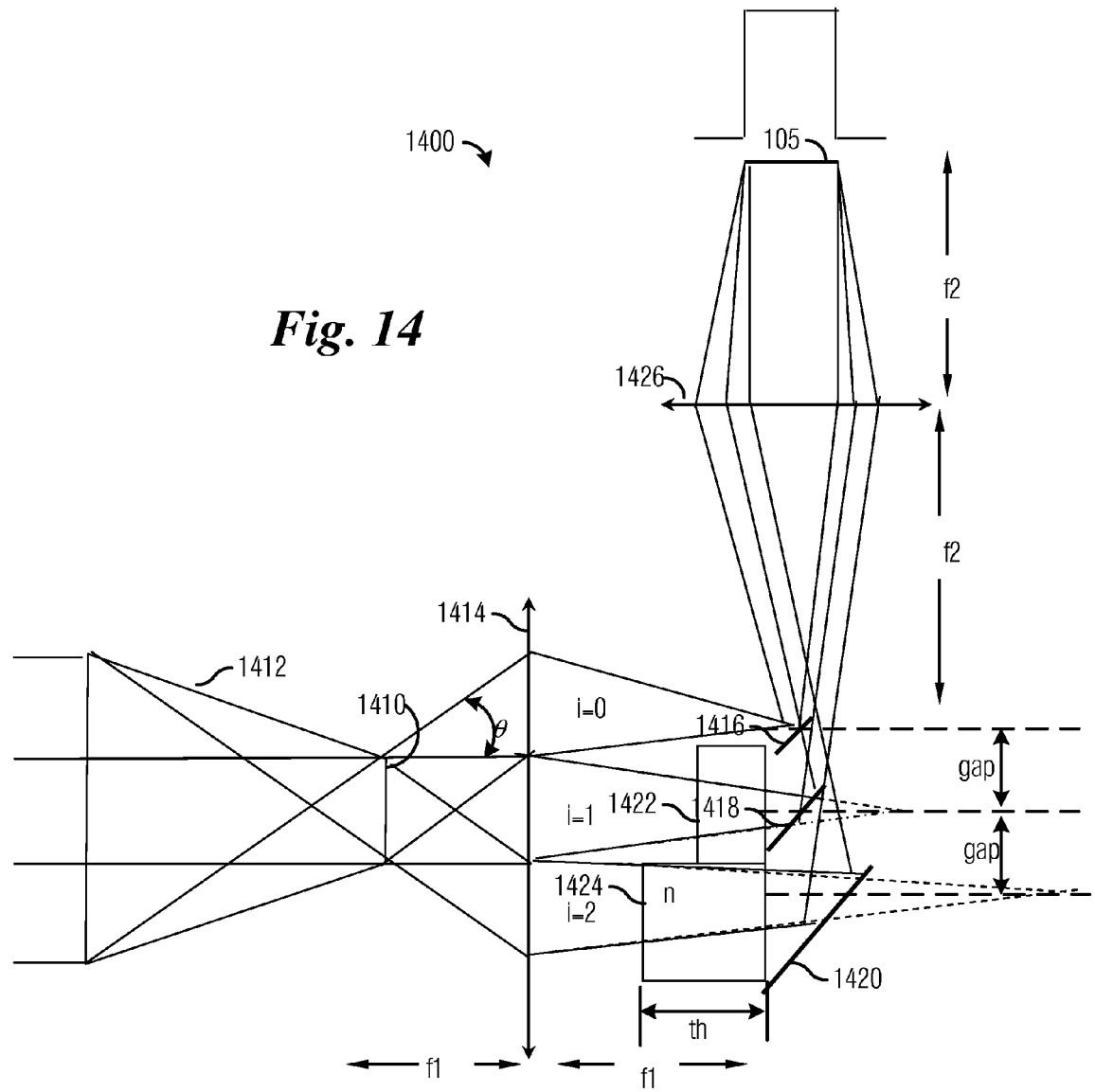
FIG. 14 illustrates an optical system for use with optical lightguides in accordance with an embodiment.

FIG. 14 illustrates an optical system 1400 that may be used to provide a uniform line of light to a spatial light modulator, such as the DMD 105 in accordance with an embodiment. One of ordinary skill in the art will appreciate that embodiments discussed above provide a line of light having a substantially top-hat distribution of light intensity, but that the light may be a divergent beam of light. Accordingly, it may be desirably to introduce optics such as the optical system 1400 between the lightguides discussed above and the DMD 105 to further shape and condition the light before being imaged onto the DMD 105.

Reference numeral 1410 represents the exit face of a lightguide having a substantially top-hat distribution of light intensity from an optical lightguide 1412, such as that discussed above with reference to FIG. 8a. It should be noted that the optical lightguide 1412 is provided for illustrative purposes only, and accordingly, other types of systems may be used providing a divergent beam of light having a substantially top-hat distribution of intensity. A first spherical lens 1414 (or a multi-lens system) is provided to redirect and refocus the light from the optical lightguide 1412. As illustrated in FIG. 14, the light from the first lens or mirror 1414 forms multiple beams of light having focal points in a common focal plane with gaps therebetween. Accordingly, a first mirror 1416, a second mirror 1418, and a third mirror 1420 are positioned to reduce the lateral separation of the multiple beams arising for the divergence of the stripe.

Also shown in FIG. 14 are optical plates 1422 and 1424. The optical plates 1422 and 1424 act to shift the focal point of the image without changing the magnification. In this manner, the focal point of the lower two beams are shifted out further away from the first spherical lens 1414 such that the mirrors may reflect the light rays to a second lens or mirror 1426 without the other mirrors interfering. For example, the thickness of the optical plate 1422 is such that focal point of the light rays of the middle beam is shifted as indicated by the dotted lines, thereby allowing the light rays to be reflected to the second spherical lens 1426 without the first mirror 1416 interfering while maintaining a constant focal plane, and the thickness of the optical plate 1424 is such that focal point of the light rays of the bottom beam is shifted as indicated by the dotted lines, thereby allowing the light rays to be reflected to the second spherical lens 1424 without the first mirror 1416 or the second mirror 1418 interfering while maintaining a constant focal plane. In an embodiment, the thickness th of the optical plates 1422 and 1424 may be determined by the following equation.

$$th = \frac{i * \sin(\theta) * f1 * n}{(n-1)}$$

wherein: th is the calculated thickness of the respective optical plate;
θ is the angle of incidence upon the first spherical lens 1414;
i is the section number of the light rays, wherein the i=0 represents section of light rays having a mirror positioned at substantially the focal length away from the first spherical lens;
f1 represents the focal length; and
n represents the refractive index of the respective optical plate.

In an embodiment, the mirror and optical plates are combined into a single element, such as a right angle prism. In this embodiment, one of ordinary skill in the art will appreciate that the mirror is replaced by a substantially loss-free total internal reflection (TIR) element.

Figure 15:
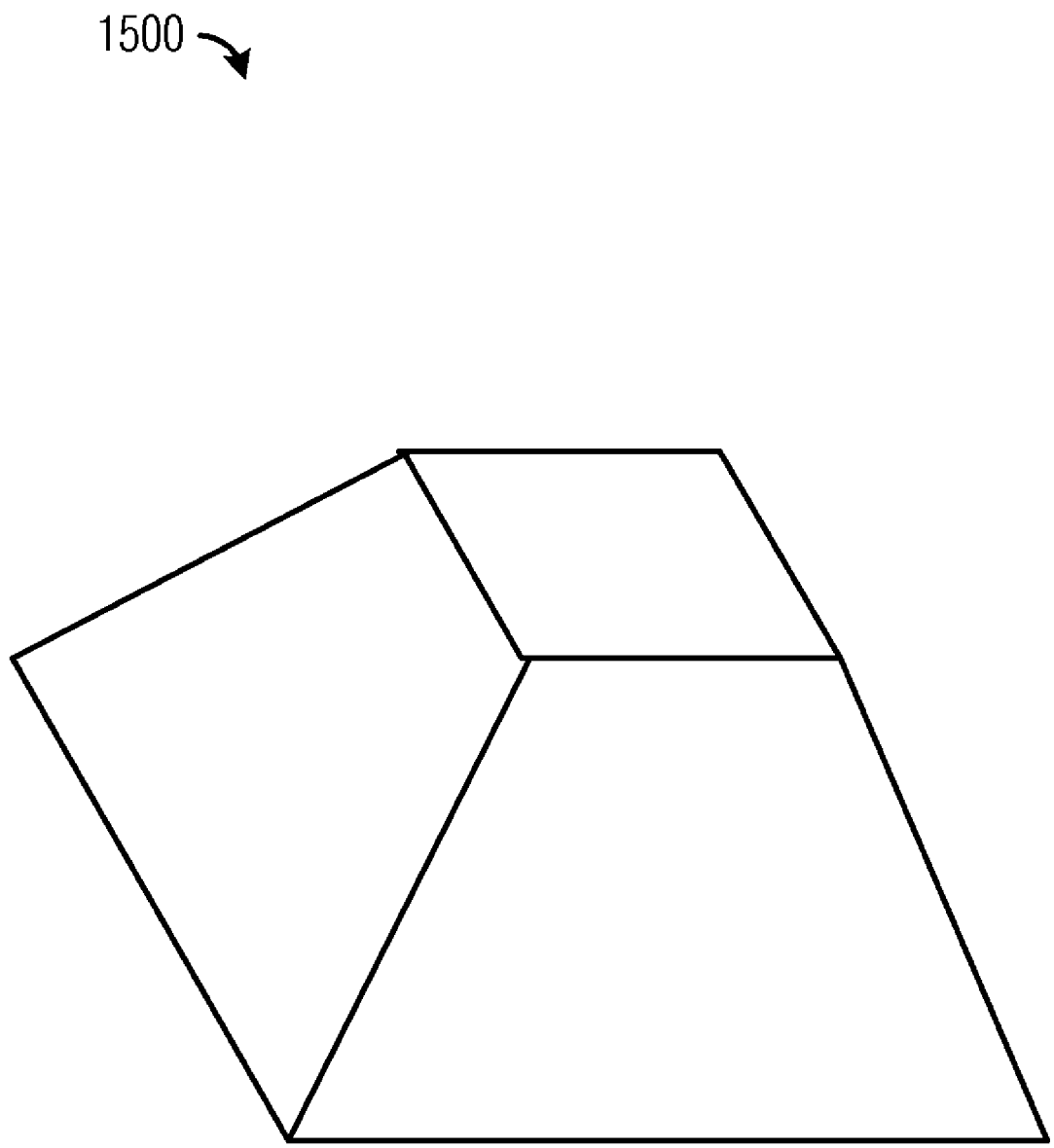
FIG. 15 is a perspective view of an optical lightguide in accordance with another embodiment.

FIG. 15 illustrates yet another embodiment of an optical lightguide 1500 in accordance with an embodiment. In particular, the planar shape of the lightguide layers 812 discussed above with reference to FIG. 8 have been replaced by a non-planar shape. It should be noted that FIG. 15 illustrates only a single layer for illustrative purposes, but may be stacked as discussed above. In the embodiment illustrated in FIG. 15, the optical lightguide 1500 has a pyramidal shape such that opposing sidewalls are both tapered and may be used with a collimated beam. It should be noted that the FIG. 15 illustrates a rectangular entrance and exit face for illustrative purposes only, and that the entrance and exit face may have other shapes, such as a hexagon, pentagon, or any other polygonal shape.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A projection display system, comprising:
a plurality of laser light sources of respective different colors;
a spatial light modulator including an array of individually controllable micromirrors for projecting light received from the plurality of light sources onto a display plane;
an optical lightguide comprising a plurality of planar trapezoidal elements having inwardly tapered sides extending between parallel entrance and exit faces; the planar trapezoidal elements being superposed in planar parallel orientations interposed between cladding layers of material having lower index of refraction than the planar trapezoidal elements, and being respectively positioned and dimensioned to receive light from respective different ones of the light sources and to shape the light into corresponding respective different lines of light of the different colors having substantially uniform light intensity across the lines; and a scanning element positioned to receive the lines of light from the optical lightguide and to scan the lines simultaneously in synchronism with control of the mirrors at spaced positions across the array of micromirrors.

2. The system of claim 1, further comprising a plurality of optical fibers mechanically coupled between respective ones of the light sources and the entrance faces of the planar trapezoidal elements.

3. The system of claim 2, wherein the laser light sources are solid-state lasers.

4. The system of claim 3, wherein the spatial light modulator is a digital micromirror device.

5. The system of claim 4, wherein the scanning element includes a rotating element having reflective surfaces and being rotatable around a rotational axis to direct the different colored lines of light to scan across sequential lines of micromirrors of the digital micromirror device.

6. The system of claim 5, wherein the planar trapezoidal elements are formed of crown glass.

7. The system of claim 6, wherein the cladding layers of material are formed of crown glass having a lower index of refraction than the crown glass of the planar trapezoidal elements.

8. The system of claim 7, wherein the planar tapezoidal elements are positioned and dimensioned to shape a Gaussian distribution of light received at the entrance faces into a top-hat distribution of light at the exit faces.

9. The system of claim 8, wherein the planar trapezoidal elements further have lenticular arrays positioned at their entrance faces for shaping and collimating light received from the respective light sources.

10. The system of claim 1, wherein the planar trapezoidal elements are positioned and dimensioned to shape a Gaussian distribution of light received at the entrance faces into a top-hat distribution of light at the exit faces.

11. The system of claim 1, wherein the planar trapezoidal elements further have lenticular arrays positioned at their entrance faces for shaping and collimating light received from the respective light sources.

12. A method of displaying an image, comprising:

providing an optical lightguide comprising a plurality of planar trapezoidal elements having inwardly tapered sides extending between parallel entrance and exit faces; the planar trapezoidal elements being superposed in planar parallel orientations interposed between cladding layers of material having lower index of refraction than the planar trapezoidal elements;

receiving light from different colored ones of a plurality of laser light sources at respective entrance faces of different ones of the planar trapezoidal elements and shaping the received light into corresponding respective different lines of light of the different colors, the lines of light having substantially uniform light intensity across the lines; and scanning the lines of light from the optical lightguide with a scanning element simultaneously at spaced positions across an array of individually controllable micromirrors of a spatial light modulator in synchronism with control of the mirrors for projecting the light received from the plurality of light sources onto a display plane.

13. The method of claim 12, wherein the light at the entrance faces is received through optical fibers mechanically coupled between respective ones of the light sources and the entrance faces of the planar trapezoidal elements.

14. The method of claim 13, wherein the laser light sources are solid-state lasers.

15. The method of claim 14, wherein the spatial light modulator is a digital micromirror device.

16. The method of claim 15, wherein the scanning element includes a rotating element having reflective surfaces and the rotating element is rotated around a rotational axis to direct the different colored lines of light to scan across sequential lines of micromirrors of the digital micromirror device.

17. The system of claim 16, wherein the planar trapezoidal elements are formed of crown glass.

18. The system of claim 17, wherein the cladding layers of material are formed of crown glass having a lower index of refraction than the crown glass of the planar trapezoidal elements.

19. The system of claim 18, wherein the planar tapezoidal elements shape Gaussian distributions of light received at the entrance faces into top-hat distributions of light at the exit faces.

* * * * *